No. 744,574. PATENTED NOV. 17, 1903.
C. A. LESKE.
PROTECTING MANTLE FOR CYCLE OR AIR TUBES.
APPLICATION FILED JUNE 4, 1903.
NO MODEL.
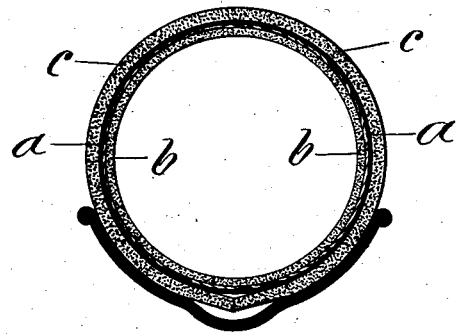

No. 744,574. Patented November 17, 1903.

UNITED STATES PATENT OFFICE.

CHRISTIAN AUGUST LESKE, OF HELDBURG, GERMANY.

PROTECTING-MANTLE FOR CYCLE OR AIR TUBES.

SPECIFICATION forming part of Letters Patent No. 744,574, dated November 17, 1903.

Application filed June 4, 1903. Serial No. 160,096. (No model.)

*To all whom it may concern:*

Be it known that I, CHRISTIAN AUGUST LESKE, merchant, a citizen of the German Empire, and a resident of Heldburg, in the Duchy of Saxe-Meiningen, German Empire, have invented certain new and useful Improvements in Protecting-Mantles for Cycles or Air-Tubes, of which the following is a specification.

The present invention relates to a protecting-mantle for pneumatic tires of cycles and other air-tubes of animal hide. Protecting-mantles of this kind made of a suitably-prepared animal hide placed between the outer mantle and the pneumatic tire are already in use, but for using these the hair was removed from the hide.

The essential feature of the present innovation is that the animal hide in a tawed state with the hair on, is put in such a manner around the pneumatic tire and between the tire and the outer mantle that the hairy side fits closely on the pneumatic tire, so that this protecting-mantle makes a tearing of the outer mantle, and especially of the pneumatic tire, almost impossible; but if the outer mantle should get damaged the animal hide prevents an extension of the rent. If the injury should penetrate deeper—namely, through the hide itself—the hairs pressed close to the tire in all parts subject to be damaged effectively protect the same.

The new arrangement is illustrated on the accompanying drawing and has many advantages.

The outer mantle is marked with $c$. Through the mantle $a$ being interposed the pneumatic tire $b$ is slightly compressed, which aids in pumping it up very tightly. In consequence of this the wheel runs better. The hairs of the hide $a$ pressed against the pneumatic tire $b$ form an elastic layer, in consequence of which the wheel runs more evenly.

The weight of the protecting-mantle is very trifling and depends, of course, on the thickness of the hide used. The hide is usually tanned with alum and cut of a size that when the pneumatic tire $b$ is pumped full with air the hide $a$ fits tightly on it with the hairy side.

The insertion of the protecting-mantle $a$ is effected by placing the same and the pneumatic tube $b$ inside of the outer mantle $c$ and by putting at intervals of from eight to twelve inches rings of twine around the outer mantle $c$, whereupon this mantle, with the mantle $a$ and tire $b$ inside, is put inside of the felly, commencing near the valve, whereby the twine is removed, one ring after the other.

What I claim as my invention, and desire to secure by Letters Patent of the United States, is—

In a tire, the combination with the inner tube, of a mantle consisting of an animal hide in a tawed state having the hair on one side thereof, said hair side of the hide being turned inwardly against the inner tube, substantially as described.

In testimony whereof I have signed my name to this specification in the presence of two subscribing witnesses.

CHRISTIAN AUGUST LESKE.

Witnesses:
 ERNST GUMPERT,
 O. HINZE.